(12) United States Patent
Wu et al.

(10) Patent No.: US 12,478,924 B2
(45) Date of Patent: Nov. 25, 2025

(54) METHOD FOR PREPARING DURABLY HYDROPHILIC AND UNIFORM-PORE ULTRAFILTRATION MEMBRANE

(71) Applicant: TIANGONG UNIVERSITY, Tianjin (CN)

(72) Inventors: Chunrui Wu, Tianjin (CN); Jingguo She, Tianjin (CN); Haifu Gao, Tianjin (CN); Xiaole Chen, Tianjin (CN); Ziping Song, Tianjin (CN); Xiaolong Lv, Tianjin (CN)

(73) Assignee: TIANGONG UNIVERSITY (CN)

( * ) Notice: Subject to any disclaimer, the term of this patent is extended or adjusted under 35 U.S.C. 154(b) by 797 days.

(21) Appl. No.: 17/814,107

(22) Filed: Jul. 21, 2022

(65) Prior Publication Data
US 2023/0035042 A1   Feb. 2, 2023

(30) Foreign Application Priority Data
Jul. 26, 2021 (CN) .......................... 202110843413.6

(51) Int. Cl.
| | | |
|---|---|---|
| *C08J 9/14* | (2006.01) | |
| *B01D 61/14* | (2006.01) | |
| *B01D 67/00* | (2006.01) | |
| *B01D 69/02* | (2006.01) | |
| *B01D 69/06* | (2006.01) | |
| *B01D 69/08* | (2006.01) | |
| *B01D 71/30* | (2006.01) | |
| *B01D 71/34* | (2006.01) | |
| *B01D 71/82* | (2006.01) | |

(52) U.S. Cl.
CPC ........ *B01D 67/0011* (2013.01); *B01D 61/145* (2013.01); *B01D 67/00165* (2022.08); *B01D 69/02* (2013.01); *B01D 69/06* (2013.01); *B01D 69/08* (2013.01); *B01D 71/301* (2022.08); *B01D 71/34* (2013.01); *B01D 71/82* (2013.01); *C08J 9/142* (2013.01); *B01D 2323/02* (2013.01); *B01D 2323/30* (2013.01); *B01D 2325/36* (2013.01); *C08J 2203/12* (2013.01); *C08J 2327/06* (2013.01)

(58) Field of Classification Search
CPC ................ B01D 61/45; B01D 67/0006; B01D 67/0011; B01D 67/0016; B01D 67/00165; B01D 67/0093; B01D 69/02; B01D 69/06; B01D 69/08; B01D 69/122; B01D 69/125; B01D 71/30; B01D 71/301; B01D 71/32; B01D 71/34; B01D 71/82; B01D 2323/02; B01D 2323/30; B01D 2323/38; B01D 2325/0212; B01D 2325/36; C08J 9/142; C08J 9/26; C08J 2201/026; C08J 2201/046; C08J 2203/12; C08J 2327/06; C08J 2433/14; C08J 2471/02

See application file for complete search history.

(56) References Cited

U.S. PATENT DOCUMENTS

2016/0168485 A1* 6/2016 Li ........................ B01J 20/3272
                                                                  210/651

FOREIGN PATENT DOCUMENTS

| CN | 111495207 A | * | 8/2020 | ............. B01D 61/18 |
| CN | 111729516 A | * | 10/2020 | ............. B01D 69/02 |
| KR | 20210072103 A | * | 6/2021 | ....... B01D 67/00931 |

OTHER PUBLICATIONS

Eng. trans. of CN-111495207-A (Year: 2020).*
Eng. trans. of CN-111729516-A (Year: 2020).*
Eng. Trans. of KR-20210072103-A (Year: 2021).*

* cited by examiner

*Primary Examiner* — John M Cooney
(74) *Attorney, Agent, or Firm* — Stetina Garred Brucker & Newboles

(57) ABSTRACT

A method for preparing a durably hydrophilic and uniform-pore ultrafiltration membrane is disclosed herein. Chemical reactions between the functional groups and the active bonds of the molecular chains in the membrane materials are initiated perform the grafting of hydrophilic chains on the polymer chains under conventional dissolution conditions of the polymer membrane material (dissolution with synchronized hydrophilization), so as to realize durable hydrophilization of the membrane materials. The resulting hydrophilized polymer solution (a nascent-state membrane) is introduced into a coagulation bath to initiate a crosslinking reaction among the hydrophilic chains. The resulting crosslinking serves to synergistically regulate subsequent phase separation and membrane formation (phase separation under synergistic crosslinking).

11 Claims, 3 Drawing Sheets

METHOD FOR PREPARING DURABLY HYDROPHILIC AND UNIFORM-PORE ULTRAFILTRATION MEMBRANE

CROSS REFERENCE TO RELATED APPLICATION

This patent application claims the benefit and priority of Chinese Patent Application No. 202110843413.6, entitled "Method for preparing durably hydrophilic and uniform-pore ultrafiltration membrane" filed on Jul. 26, 2021, the disclosure of which is incorporated by reference herein in its entirety as part of the present application.

TECHNICAL FIELD

The present disclosure belongs to the technical field of filtration membranes, and relates to an ultrafiltration membrane, in particular to a method for preparing a durably hydrophilic and uniform-pore ultrafiltration membrane.

BACKGROUND

Membrane materials such as polyvinyl chloride (PVC), polyvinylidene fluoride (PVDF) and polyvinylidene fluoride-chlorotrifluoroethylene (PVDF-CTFE) are widely used in process of ultrafiltration, and have desirable properties such as acid and alkali resistance, chemical stability, mechanical stability and weather resistance. However, due to their inherent hydrophobicity, these membrane materials are prone to the problems such as pollution and low flux during use, which limit their applications. Therefore, hydrophilic materials are generally introduced via blending to increase the hydrophilicity of ultrafiltration membranes. However, the introduction of hydrophilic materials increases the hydrophilicity of the polymers and enhances the affinity of the molecular chains with coagulants, which renders the hydrophilic molecular chains growing in an extending way towards a coagulation bath, thus forming open pores on a membrane surface. Moreover, due to an absence of stable chemical bonds between hydrophilic molecules and membrane materials, the hydrophilic molecules are easily lost during use, resulting in decrease in performances of the membranes.

BRIEF SUMMARY

An objective of the present disclosure is to provide a method for preparing a durably hydrophilic and uniform-pore ultrafiltration membrane. In the method, dissolution with grafting hydrophilization and phase separation under synergistic crosslinking are performed, by which the hydrophilization of membrane materials and the uniformization of pore sizes are simultaneously achieved during the membrane preparation, and the permeation flux, separation performance and anti-pollution capacity of the ultrafiltration membranes are improved simultaneously.

In order to achieve the above objective, the specific technical solutions of the method for preparing a durably hydrophilic and uniform-pore ultrafiltration membrane according to present disclosure are provided as follows.

According to the present disclosure, the method for preparing a durably hydrophilic and uniform-pore ultrafiltration membrane comprises:

stirring a polymer membrane material with reactive sites, reactive active hydrophilic molecules, a membrane-forming porogen and a solvent at constant temperature and performing hydrophilic chain grafting under a conventional dissolution condition of the polymer membrane material to form a casting solution; then, preparing an ultrafiltration membrane by dry-wet phase separation method, and initiating a crosslinking reaction among the hydrophilic chains with a coagulation bath and immobilizing to thus form a membrane, which is the finished ultrafiltration membrane.

In some embodiments, the proportions of the components in the casting solution are: the polymeric membrane material has a weight percentage in a range of 13 wt % to 20 wt %, the solvent has a weight percentage in a range of 86 wt % to 75 wt %, the membrane-forming porogen has a weight percentage in a range of 0.1 wt % to 20 wt %, and the reactive active molecule has a weight percentage in a range of 0.1 wt % to 20 wt %, based on a total weight of 100 wt % of the casting solution.

In some embodiments, the polymer membrane material is one or a mixture of two or more selected from the group consisting of polyvinyl chloride, chlorinated polyvinyl chloride, polyvinylidene fluoride and polyvinylidene fluoride-chlorotrifluoroethylene copolymer. In some embodiments, the membrane-forming porogen is one or a mixture of two or more selected from the group consisting of: polyethylene glycol and polyvinylpyrrolidone with a molecular weight in a range of 200 to 20,000. In some embodiments, the solvent is one or a mixture of two or more selected from the group consisting of dimethylformamide, dimethyl sulfoxide and dimethyl acetamide. In some embodiments, the stirring under constant temperature is conducted in a range of 40° C. to 80° C. for 2 h to 48 h. In some embodiments, the reactive active hydrophilic molecule is a hydrophilic molecule capable of being grafted on a polymer molecular chain and crosslinked secondarily, for example one or a mixture of two or more selected from the group consisting of: aminopropyl trimethoxysilane, aminopropyl triethoxysilane, aminopropyl methyl dimethoxysilane, aminopropyl methyl diethoxysilane, divinyltriamine propylmethyl dimethoxysilane, N-(2-aminoethyl)-3-aminopropyl trimethoxysilane, N-(2-aminoethyl)-3-aminopropyl dimethoxysilane, mercaptopropyl triethoxysilane, mercaptopropyl trimethoxysilane and (3-piperazinopropyl)trimethoxysilane. In some embodiments, the coagulation bath is an aqueous solution of sodium hydroxide or hydrochloric acid having a concentration in a range of 1 wt % to 30 wt %, and is controlled within a temperature range of 25° C. to 80° C. In some embodiments, the ultrafiltration membrane is selected from the group consisting of: a flat membrane and a hollow fiber membrane.

An ultrafiltration membrane mainly removes impurities from water through the pore-size sieving. Due to the randomness of the phase separation process, most ultrafiltration membranes have relatively wide pore-size distributions, limiting the separation efficiency of these separation membranes. Analyzing the principle of the ultrafiltration membrane formation (that is, the phase separation), the pore size and distribution of an ultrafiltration membrane are mainly affected by the migration and the immobilization processes of polymer molecular chains in a casting solution, namely the formation, growth and immobilization of polymer micelles during a phase separation. If an "anchor point" that may be excited by a coagulant system is set in the polymer molecular chains/hydrophilic grafting chains of membrane materials, stable interactions among the polymer molecular chains are formed via exciting the "anchor points" during phase separation, and thus the relatively random processes of nucleation and growth of polymer micelles is transformed into controllable formation and immobilization of a polymer network, thereby achieving more precise regulation based on the polymer chain migration, reaction and formation and immobilization of a crosslinking network, making it possible to uniformly regulate the pore sizes of the ultrafiltration membranes.

In the present disclosure, the molecules of polyvinyl chloride, polyvinylidene fluoride and polyvinylidene fluoride-chlorotrifluoroethylene comprise C—X (X refers to F or Cl) bonds, which may act as reactive sites for in-situ grafting. Chemical reactions between the functional groups and the active bonds of the molecular chains in the membrane materials are conducted to initiate and perform the grafting of hydrophilic chains on the polymer chains under conventional dissolution conditions of the polymer membrane material (i.e., the dissolution with synchronized hydrophilization), so as to realize durable hydrophilization of the membrane materials. Further, after the polymer solution (a nascent-state membrane) is introduced into a coagulation bath, a crosslinking reaction among the hydrophilic chains is initiated with the coagulation bath, by which the phase separation and membrane formation are synergistically regulated (i.e., the phase separation under synergistic crosslinking). Under the interference of the crosslinked structure in the movement of polymer molecular chains, phase separation, immobilization and membrane formation, a relatively uniform and regular polymer network structure is finally formed, thereby obtaining a structure with uniform pores. In the method above, the hydrophilization of membrane materials and the uniformization of pore sizes are realized synchronously during the membrane preparation, and the permeation flux, separation performance and anti-pollution capacity of the ultrafiltration membranes are improved simultaneously.

The present disclosure has the following advantages and beneficial effects:
1) In the present disclosure, durable hydrophilization of a polymer membrane material is realized under dissolution conditions of the polymer membrane material.
2) In the present disclosure, a crosslinking reaction among hydrophilic chains is initiated with a coagulation bath during phase separation. Under the interference of a crosslinked structure in the movement of molecular chains in the polymer membrane material, the phase separation, the immobilization and membrane formation, a relatively uniform and regular polymer network structure is formed in the ultrafiltration membrane, thereby realizing uniform regulation of a pore structure in the ultrafiltration membrane.
3) In the present disclosure, a simultaneous improvement in permeation flux, separation performance and anti-pollution capacity of an ultrafiltration membrane is achieved through a method performing both the dissolution with grafting hydrophilization and the phase separation under synergistic crosslinking.

DETAILED DESCRIPTION

Figure 1:
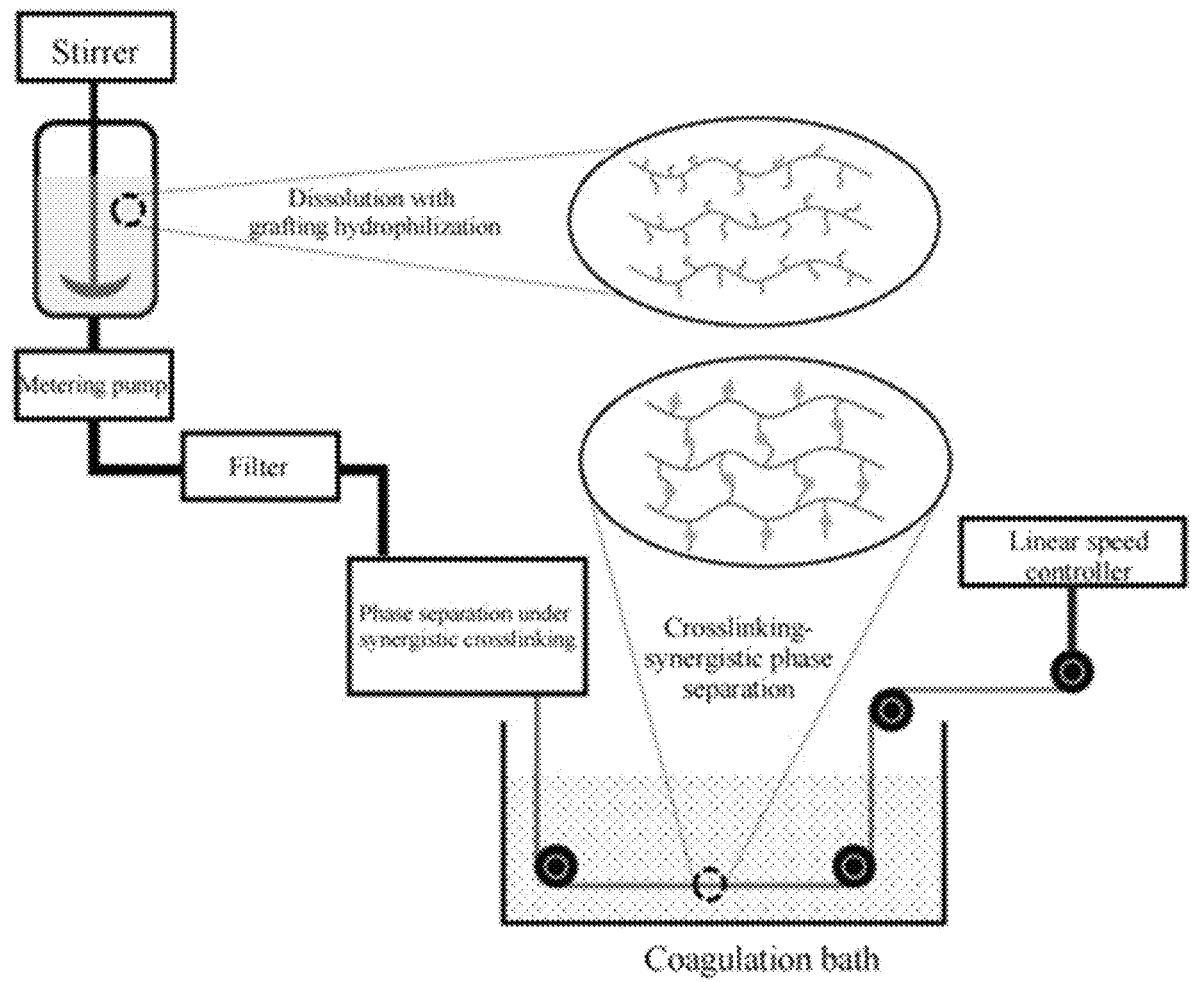
FIG. 1 shows a principal diagram of the method according to the present disclosure.

In order to better understand the purpose, structure and function of the present disclosure, the preparation method of a high-performance ultrafiltration membrane of the present disclosure will be described in further detail below.

Examples 1 to 11

13 wt % of a polyvinyl chloride resin (as a polymer membrane material), 5 wt % of polyethylene glycol 200 (as a porogen) and 75 wt % of dimethylformamide (as a solvent) were weighed, and 7 wt % of reactive active hydrophilic molecules were added thereto to be stirred at a constant temperature of 40° C. for 48 h until completely dissolved to form a uniform solution. After membrane scraping, the membrane was placed in a coagulation bath with a crosslinking factor to prepare a flat ultrafiltration membrane by phase inversion. The types of reactive active hydrophilic molecules and the compositions of coagulation baths were shown in Table 1, and the temperature of the coagulation baths was 25° C.

TABLE 1

Effect of adding different reactive active molecules on properties of polyvinylchloride flat membrane.

| No. | | Reactive active molecule | Coagulation bath | Water contact angle (°) | Water contact angle after 300 h of testing | Flux recovery rate (%) |
|---|---|---|---|---|---|---|
| Example 1 | Control group | No addition | Deionized water | 90 | 93 | 73 |
| Example 2 | Experimental group | Aminopropyl triethoxysilane | Deionized water (pH = 1) | 75 | 75 | 96 |
| Example 3 | Experimental group | Aminopropyl methyl dimethoxysilane | Deionized water (pH = 3) | 76 | 76 | 93 |
| Example 4 | Experimental group | Aminopropyl methyl diethoxysilane | Deionized water (pH = 5) | 72 | 72 | 90 |
| Example 5 | Experimental group | Divinyltriamine propylmethyl dimethoxysilane | Deionized water (pH = 7) | 76 | 76 | 95 |
| Example 6 | Experimental group | N-(2-aminoethyl)-3-aminopropyl trimethoxysilane | Deionized water (pH = 9) | 75 | 75 | 93 |

TABLE 1-continued

Effect of adding different reactive active molecules on properties of polyvinylchloride flat membrane.

| | No. | Reactive active molecule | Coagulation bath | Water contact angle (°) | Water contact angle after 300 h of testing | Flux recovery rate (%) |
|---|---|---|---|---|---|---|
| Example 7 | Experimental group | N-(2-aminoethyl)-3-aminopropyl dimethoxysilane | Deionized water (pH = 11) | 68 | 68 | 90 |
| Example 8 | Experimental group | Mercaptopropyl triethoxysilane | Deionized water (pH = 13) | 69 | 69 | 89 |
| Example 9 | Experimental group | Mercaptopropyl trimethoxysilane | Deionized water (pH = 10) | 65 | 65 | 89 |
| Example 10 | Experimental group | (3-piperazinopropyl)trimethoxysilane | Deionized water (pH = 2) | 66 | 66 | 87 |
| Example 11 | Experimental group | Aminopropyl trimethoxysilane | Deionized water (pH = 7) | 63 | 63 | 93 |

Table 1 shows the effects of adding different reactive active molecules to the casting solution on the hydrophilicity/hydrophobicity and anti-pollution capacity of a polyvinyl chloride ultrafiltration membrane. Example 1 is a control group, and Examples 2 to 11 are the polyvinyl chloride ultrafiltration membranes prepared by adding aminopropyl triethoxysilane, aminopropyl methyl dimethoxysilane, aminopropyl methyl diethoxysilane, divinyltriamine propylmethyl dimethoxysilane, N-(2-aminoethyl)-3-aminopropyl trimethoxysilane, N-(2-aminoethyl)-3-aminopropyl dimethoxysilane, mercaptopropyl triethoxysilane, mercaptopropyl trimethoxysilane, (3-piperazinopropyl)trimethoxysilane and aminopropyl trimethoxysilane to the casting solution through the phase inversion in deionized water with different pH values, respectively. Compared with the control group Example 1, the ultrafiltration membrane has a lower water contact angle, a stable water contact angle after 300 h operation in pure water, and a significantly improved flux recovery rate compared with the control group. Thus, it may be confirmed that by introducing the reactive active ammonia-based molecules into the casting solution, the hydrophilicity of the ultrafiltration membrane is improved, a durable hydrophilicity is achieved, and the anti-pollution capacity of the ultrafiltration membrane is increased.

Examples 12 to 16

20 wt % of a polyvinylidene fluoride resin (as a polymer membrane material), 3 wt % of polyvinylpyrrolidone (as a porogen) and a certain amount of dimethylformamide (as a solvent) were weighed, and finally a certain amount of aminopropyl trimethoxysilane (as reactive active hydrophilic molecules) was added to maintain a total amount of 100% of a casting solution; the casting solution was stirred at a constant temperature of 80° C. for 24 h until completely dissolved to form a uniform solution. After membrane scraping, the membrane was placed in a coagulation bath with a crosslinking factor to prepare a flat ultrafiltration membrane by phase inversion.

The additive amounts of aminopropyl trimethoxysilane were as shown in Table 2. The coagulation bath was deionized water with a pH value of 8.5 and had a temperature of 80° C.

TABLE 2

Effect of additive amount of reactive active molecules on properties of polyvinylidene fluoride hollow fiber membrane

| No. | Additive amount of active molecules (%) | Water contact angle (°) | Crosslinking degree (%) | Flux (L/m$^{-2}$ h bar) | BSA retention rate (%) | Flux recovery rate (%) |
|---|---|---|---|---|---|---|
| Example 12 | 0.1 | 92 | 66 | 232.1 | 96.0 | 85 |
| Example 13 | 2 | 80 | 69 | 619.1 | 96.9 | 90 |
| Example 14 | 3 | 75 | 75 | 702.4 | 96.4 | 93 |
| Example 15 | 7 | 70 | 83 | 934.2 | 96.1 | 95 |
| Example 16 | 20 | 60 | 98 | 970.9 | 96.9 | 97 |

Figure 2:
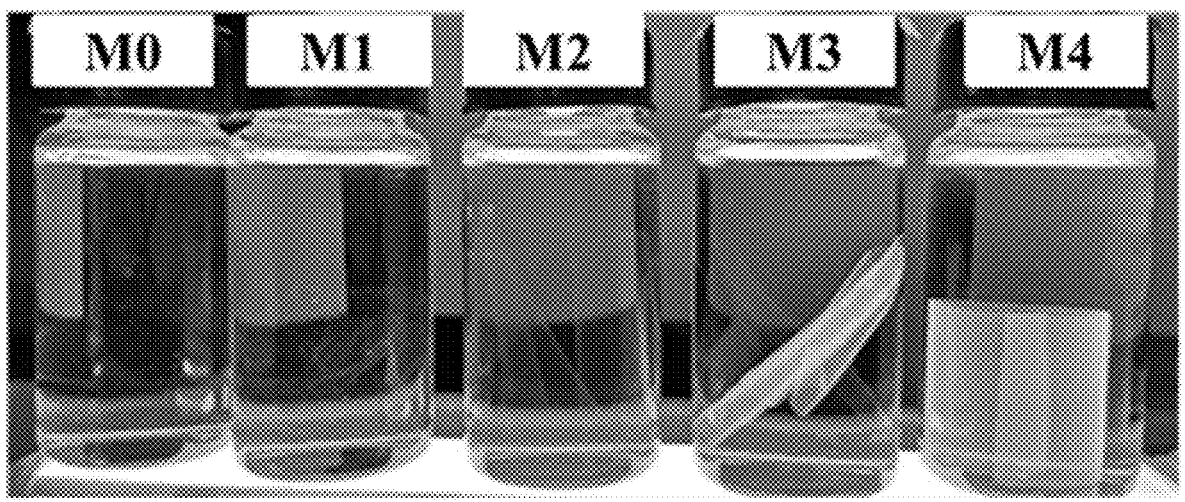
FIG. 2 shows a comparison of dissolution of ultrafiltration membranes with different additive amounts of active hydrophilic molecules in a solvent.
Figure 3:
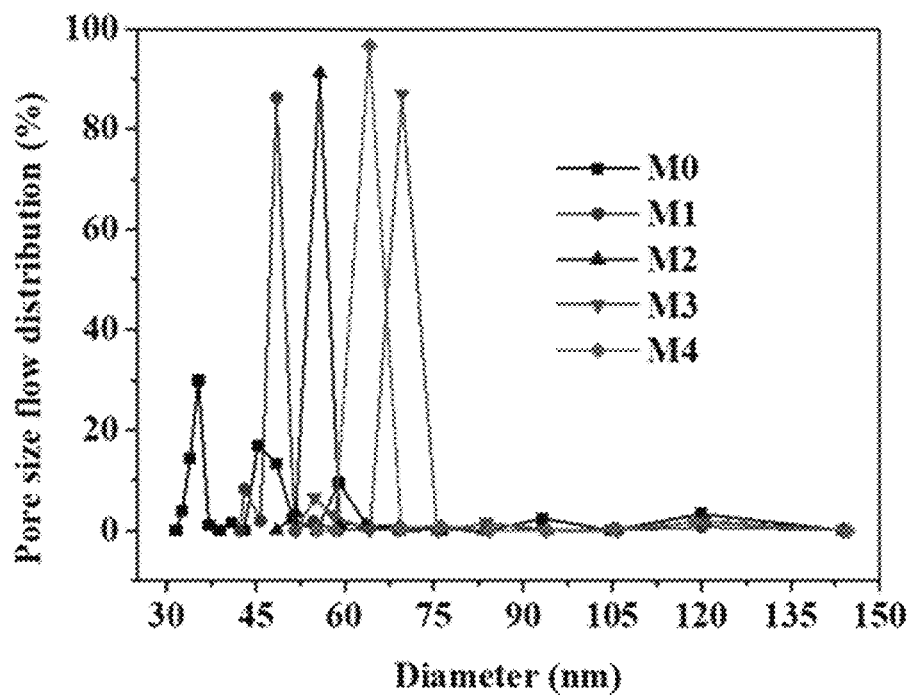
FIG. 3 shows a comparison of pore size and pore-size distribution of ultrafiltration membranes with different additive amounts of active hydrophilic molecules.
Figure 4:
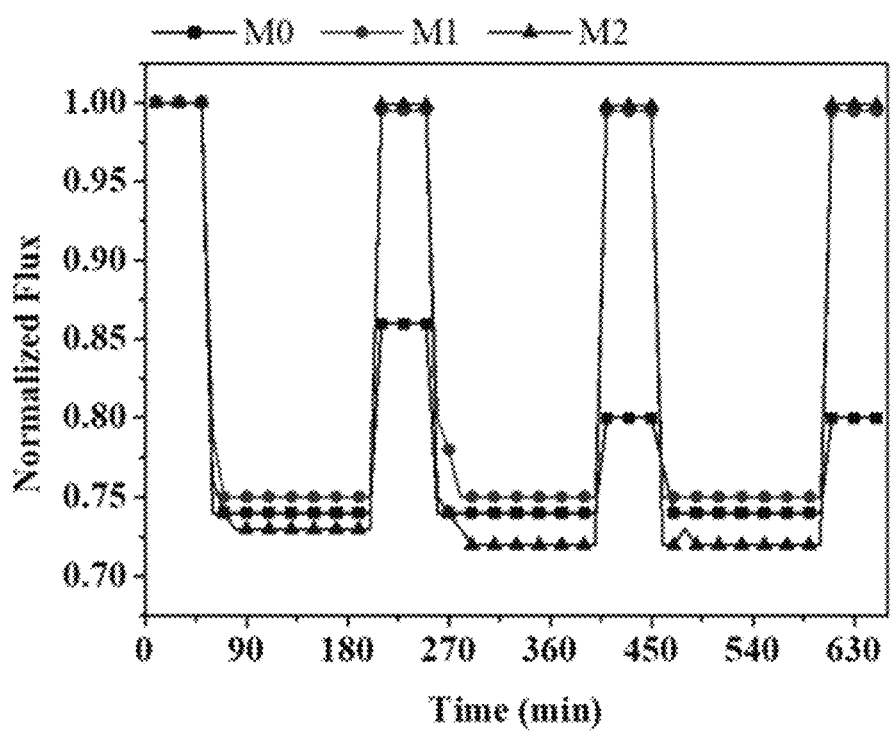
FIG. 4 shows a comparison of anti-pollution capacity of ultrafiltration membranes with different additive amounts of active hydrophilic molecules.

Table 2 shows the effects of additive amount of reactive active molecules on properties of the polyvinylidene fluoride hollow fiber ultrafiltration membrane. Examples 12 to 16 are the ultrafiltration membranes prepared by adding different amounts of reactive active molecules to the casting solution. Compared with control group Example 1, with the increase in the additive amount of reactive active molecules, the ultrafiltration membrane shows an increasing trend in flux, maintains a stable retention rate of BSA molecules, and has a significantly decreased water contact angle and an increased flux recovery rate. The normalized flux results are shown in FIG. 4, where M0 represents the control group, namely the ultrafiltration membrane without reactive active molecules added, and M1 and M2 represent Examples 12 and 13, respectively. Compared with M0, the ultrafiltration membrane has an improved anti-pollution capacity after adding the reactive active molecules, and the anti-pollution capacity increases with an increase in additive amount, indicating that an increased amount of reactive active molecule contributes to improving the hydrophilicity, anti-pollution capacity and filtration performance of ultrafiltration membranes. The dissolution of the ultrafiltration membranes obtained in Examples 12 to 16 in the solvent of dimethylacetamide is shown in FIG. 2, where M0 represents the control group of ultrafiltration membrane without adding the reactive active molecules, and M1, M2, M3 and M4 correspond to Examples 12, 13, 14 and 15, respectively. Compared with control group M0, the ultrafiltration membranes gradually become insoluble and the crosslinking degree increase with the increase in the additive amount of the reactive active molecules, indicating that the molecular chains in the ultrafiltration membrane are successfully crosslinked after adding the reactive active molecules. The pore sizes and pore size flow distributions of the ultrafiltration membranes obtained from Examples 12 to 15 are shown in FIG. 3, where M0 represents control group Example 1, and M1, M2, M3 and M4 correspond to Examples 12, 13, 14 and 15, respectively. Compared with the control group M0, after adding the reactive active molecules, the pore size distributions of the ultrafiltration membranes become more uniform from a wider distribution of M0; moreover, with the increase in additive amount of the reactive active molecules, the ultrafiltration membranes have a larger average pore size under the condition that a maximum pore size remains the same, which help to improve the separation efficiency of the ultrafiltration membranes, indicating that the pore sizes of the ultrafiltration membrane may be uniformized after adding the reactive active molecules.

It will be understood that the present disclosure is described with reference to the examples, and those skilled in the art should know that various changes or equivalent substitutions can be made to the features and examples of the present disclosure without departing from the spirit and scope of the present disclosure. In addition, under the teachings of the present disclosure, these features and examples can be modified to adapt to specific conditions and materials without departing from the spirit and scope of the present disclosure. Therefore, the present disclosure is not limited by the disclosed specific examples, and all examples falling within the scope of the claims of this application should belong to the protection scope of the present disclosure.

What is claimed is:

1. A method for preparing a durably hydrophilic and uniform-pore ultrafiltration membrane, the method comprising the steps of:
   a) combining a polymer membrane material with reactive sites, reactive active hydrophilic molecules having hydrophilic chains, a membrane-forming porogen, and a solvent at constant temperature under conditions suitable to dissolve the polymer membrane material and to graft the reactive active hydrophilic molecules to the reactive sites, to derive a hydrophilized polymer solution having the polymer membrane material dissolved therein, with the hydrophilic chains of the reactive active hydrophilic molecules grafted to the reactive sites;
   b) introducing the hydrophilized polymer solution into a coagulation bath to initiate a crosslinking reaction among the hydrophilic chains grafted to the reactive sites to form a hydrophilized polymer solution have a crosslinked network; and
   c) performing a dry-wet phase separation process upon the hydrophilized polymer solution having a crosslinked network to produce an ultrafiltration membrane, the ultrafiltration membrane having an improved membrane-pore structure due to the crosslinked network synergistically restricting both the movement of polymer chains and the formation and growth of micelles during the dry-wet phase separation process.

2. The method of claim 1, wherein in step a), the polymer membrane material with reactive sites, the reactive active hydrophilic molecules, the membrane-forming porogen, and the solvent are provided in an amount of weight percentage of the hydrophilized polymer solution of: 13% to 20% polymer membrane material with reactive sites, 0.1% to 20% reactive active hydrophilic molecules, 0.1% to 20% membrane forming porogen, and 75% to 86% solvent.

3. The method according to claim 1, wherein the polymer membrane material with reactive sites is a polymer material comprising C—X bonds, wherein X is a functional group selected from the group consisting of: Cl and F.

4. The method according to claim 3, wherein the polymer membrane material is one or a mixture of two or more materials selected from the group consisting of: polyvinyl chloride, chlorinated polyvinyl chloride, polyvinylidene fluoride, and a polyvinylidene fluoride-chlorotrifluoroethylene copolymer.

5. The method according to claim 1, wherein the reactive active hydrophilic molecule is a hydrophilic molecule capable of being grafted on a polymer molecular chain and comprising a secondary crosslinking group.

6. The method according to claim 5, wherein the reactive active hydrophilic molecule is one or a mixture of two or more molecules selected from the group consisting of: aminopropyl trimethoxysilane, aminopropyl triethoxysilane, aminopropyl methyl dimethoxysilane, aminopropyl methyl diethoxysilane, divinyltriamine propylmethyl dimethoxysilane, N-(2-aminoethyl)-3-aminopropyl trimethoxysilane, N-(2-aminoethyl)-3-aminopropyl dimethoxysilane, mercaptopropyl triethoxy-silane, mercaptopropyl trimethoxysilane, and (3-piperazinopropyl)trimethoxysilane.

7. The method according to claim 1, wherein the membrane-forming porogen has a molecular weight in a range of 200 to 20,000, and is one or a mixture of two or more polymers selected from the group consisting of: polyethylene glycol and polyvinyl pyrrolidone.

8. The method according to claim 1, wherein the solvent is one or a mixture of two or more solvents selected from the group consisting of: dimethyl formamide, dimethyl sulfoxide, and dimethyl acetamide.

9. The method according to claim 1, wherein combining step is conducted at a temperature in a range of 40° C. to 80° C. for 2 h to 48 h.

10. The method according to claim 1, wherein the coagulation bath is an aqueous solution of sodium hydroxide or hydrochloric acid with a concentration in a range of 1 wt % to 30 wt %, and is controlled within a temperature range of 25° C. to 80° C.

11. The method according to claim 1, wherein the durably hydrophilic and uniform-pore ultrafiltration membrane is produced in a form selected from the group consisting of: a flat membrane and a hollow fiber membrane.

* * * * *